United States Patent [19]
Probst

[11] 4,158,131
[45] Jun. 12, 1979

[54] METHOD AND APPARATUS FOR AUTOMATIC PARALLAX DETERMINATION

[75] Inventor: Reinhard Probst, Nauborn, Fed. Rep. of Germany

[73] Assignee: Ernst Leitz Wetzlar GmbH, Wetzlar, Fed. Rep. of Germany

[21] Appl. No.: 824,220

[22] Filed: Aug. 12, 1977

[30] Foreign Application Priority Data

Aug. 19, 1976 [DE] Fed. Rep. of Germany ....... 2637284

[51] Int. Cl.² .................................................. G01J 1/20
[52] U.S. Cl. ..................... 250/201; 250/204; 354/25
[58] Field of Search ................ 250/201, 204, 209; 354/25; 356/4, 5, 28

[56] References Cited
U.S. PATENT DOCUMENTS

| | | | |
|---|---|---|---|
| 4,037,958 | 7/1977 | Schmidt et al. | 356/4 |
| 4,047,022 | 9/1977 | Holle | 354/25 |
| 4,080,531 | 3/1978 | Stauffer | 250/201 |

*Primary Examiner*—David C. Nelms
*Attorney, Agent, or Firm*—Schwartz, Jeffery, Schwaab, Mack, Blumenthal & Koch

[57] ABSTRACT

Disclosed is a method for automatically determining parallax in a stereoscopic system, comprising the steps of: passing at least two imaging light channels through a moving grating structure; converting the light rays into separate electrical signals after passage through the moving grating structure; differentiating the input signals; multiplying the differentiated signals with the opposite input signal; subtracting the signals obtained by the multiplication from each other to obtain a signal corresponding to parallax. This signal in turn can be utilized to adjust the parallax to zero by actuating optical adjustment means. Also disclosed is the apparatus for carrying out this method.

30 Claims, 2 Drawing Figures

METHOD AND APPARATUS FOR AUTOMATIC PARALLAX DETERMINATION

BACKGROUND OF THE INVENTION

The present invention is concerned with a method and apparatus for making parallax determinations and, more particularly, it is concerned with a method for automatically making parallax determinations in stereoscopic, optical systems, preferably binary optical systems, having at least one movable grating structure in the path of imaging light. Such systems can be, for example, base range finder systems. The parallax determination is made on the basis of differentiable luminous fluxes which are converted into electrical signals. The invention is further concerned with apparatus for carrying out such determinations.

In stereoscopic optical systems, it is generally desirable that the parallax between two partial images be determined automatically. This is particularly so in the case of base range finders, or in connection with the analysis of aerial stereo photographs. Various systems for optical-electrical scanning and for the subsequent use or processing of the resulting electrical signals have already been suggested for these purposes.

One such prior art system is shown in FIG. 1 of the drawing, where the fundamental wave of the resulting signals is being utilized. Two objective lenses 10 and 11, which define two light channels, project an image of an object (not shown) onto a grating structure 16, via deflecting mirrors 12, 13, 14 and 15. The grating structure is movable perpendicularly with respect to the optical axes 18 and 19 by means of a drive 17' which is controlled by a generator 17. In line with each optical axis a photoelectric receiver 20 or 21, respectively, is arranged which converts the light portions which have passed through the grating structure 16 into electrical signals. Each of the two receivers 20 and 21 is connected to a phase discriminator or comparator 22 or 23, respectively, which is controlled by means of a reference signal received from the generator 17. The output of the discriminator 22 of the first light channel is connected to the drive 17' of the grating structure 16 via a control member 24. The output of the discriminator 23, in turn, controls an adjustment mechanism 25 via a control member 26. The mechanism 25 provides mechanical means for pivoting the mirror 15 along the direction of the arrow as indicated.

The operation of the system of FIG. 1 is such that the first light channel determines the position phase difference and, with the aid of the control member 24, shifts the median position of the grating structure 16 until it reaches the point where the output signal of the phase discriminator 22 reaches zero. At this point, the phase discriminator 23 indicates the parallax. The control member 26 and the drive 25 for the mirror 15 serve to adjust the resultant parallax to zero.

One shortcoming of this prior art system is that it requires two feedback loops which are coupled by the grating structure.

U.S. Pat. No. 3,710,124 describes a method which uses the fundamental wave and the second harmonic of the grating frequency. A shortcoming of the method disclosed in the patent, as can be demonstrated, resides in that the accuracy of the measurement obtained is dependent upon the accuracy with which the amplification has been adjusted and the latter, in turn, is dependent on the amplitude of the fundamental wave and of the second harmonic, respectively.

SUMMARY OF THE INVENTION

Underlying the present invention is the primary objective of developing an improved method, as well as an optical system for its application, which are free of the shortcomings described hereinabove.

Furthermore, it is an object of the invention to provide a novel optical system which is less complex in structure and, consequently, less susceptible to malfunction, while producing signals which are more accurate and/or can be used more easily.

In accomplishing the foregoing objects, there is provided according to the invention a method for automatically generating an electrical signal corresponding to parallax in a stereoscopic system, comprising the steps of: passing at least two imaging light channels or beams through a moving grating structure; converting the light channels into separate electrical input signals after passage through the grating structure; differentiating two of the input signals; multiplying each differentiated signal with the opposite input signal; subtracting the signals obtained by the multiplication from each other; and multiplying the resulting signal with a reference signal which is dependent on the relative movement of the grating structure. The signal obtained by the last multiplication controls an indicating device and/or a servo arrangement. The signal obtained by the last multiplication can be smoothed. Also, signal components bearing no measuring informations, as for instance d.c. signal, can be removed from the signals to be subtracted and from the signal obtained by the subtraction.

According to another aspect of the invention, there is provided an apparatus for automatically generating an electrical signal corresponding to parallax in a stereoscopic system, which apparatus comprises: at least one movable grating structure; means for moving the grating structure; means for passing at least two imaging light channels through the moving grating structure; means for converting the light channels into separate first and second electrical input signals after passage through the grating structure; means for differentiating said first and second electrical input signals to produce respective first and second differentiated signals; means for multiplying the first differentiated signal with the second input signal and for multiplying the second differentiated signal with the first input signal; means for subtracting the signals from the multiplication step from each other; means for multiplying the signal obtained by the subtraction step with a reference signal dependent on the relative movement of the grating structure to provide an electrical signal corresponding to the parallax. The thus obtained signal preferably controls means for displaying this signal and/or a servo arrangement.

Further special objects, features and advantages of the invention will become apparent from the following description, when taken together with the accompanying drawings which illustrate several optical systems.

DESCRIPTION OF PREFERRED EMBODIMENTS

Using a method of the general type which is described in the introductory paragraphs, the objectives of the present invention can be attained by differentiating two of the generated electrical signals, multiplying the differentiated signals with the opposite generated electrical signal, subtracting from each other the signals obtained by the multiplication and multiplying the resulting subtraction signal with a reference signal to obtain an operating signal corresponding to parallax in the system.

The present invention also provides an optical system for carrying out the novel method, the system being characterized in that the electrical signals which are obtained by means of photoelectric receivers are fed to a differentiation stage and to a multiplication stage from which the signals are directed to a subtraction stage. The signal obtained in the subtraction stage is multiplied in a multiplication stage with a reference signal which is responsive to the speed of motion of the grating structure.

Next following the multiplication means may optionally be an integration means, and the photoelectric receivers may optionally be followed by low-pass filters. Following the subtraction means can be high-pass filters or high-pass filters can precede the subtraction means. The reference signal can be produced using a differentiating means or an additional scanner. On the other hand, a generator with the appropriate output means can also be used for the production of the reference signal. The last multiplication means can be a phase-sensitive rectifier, an electronic flip-flop or a ring modulator.

Figure 1:
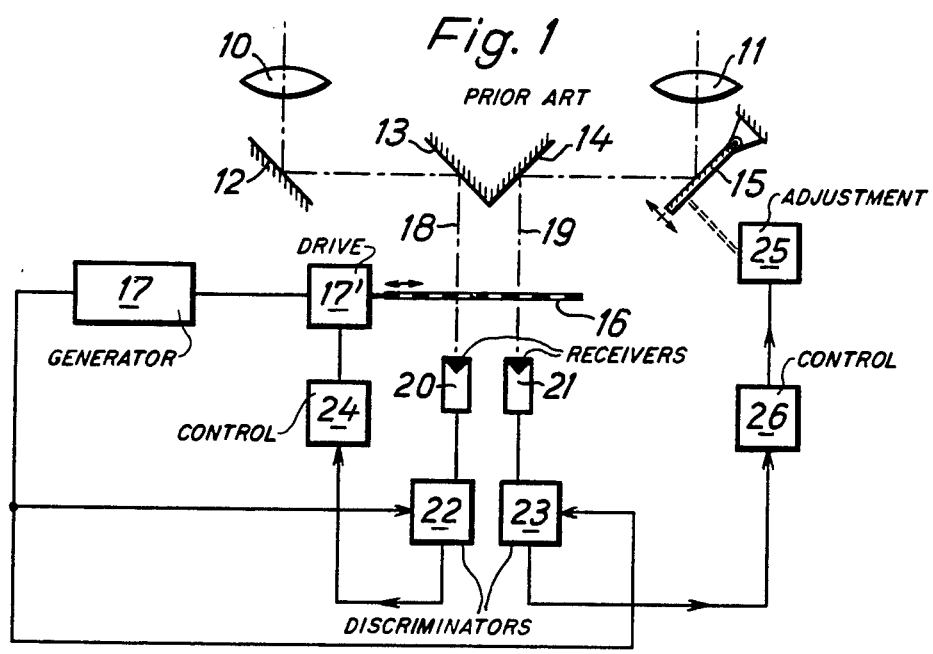
FIG. 1 shows a prior art optical system, designed for a known method of parallax determination.
Figure 2:
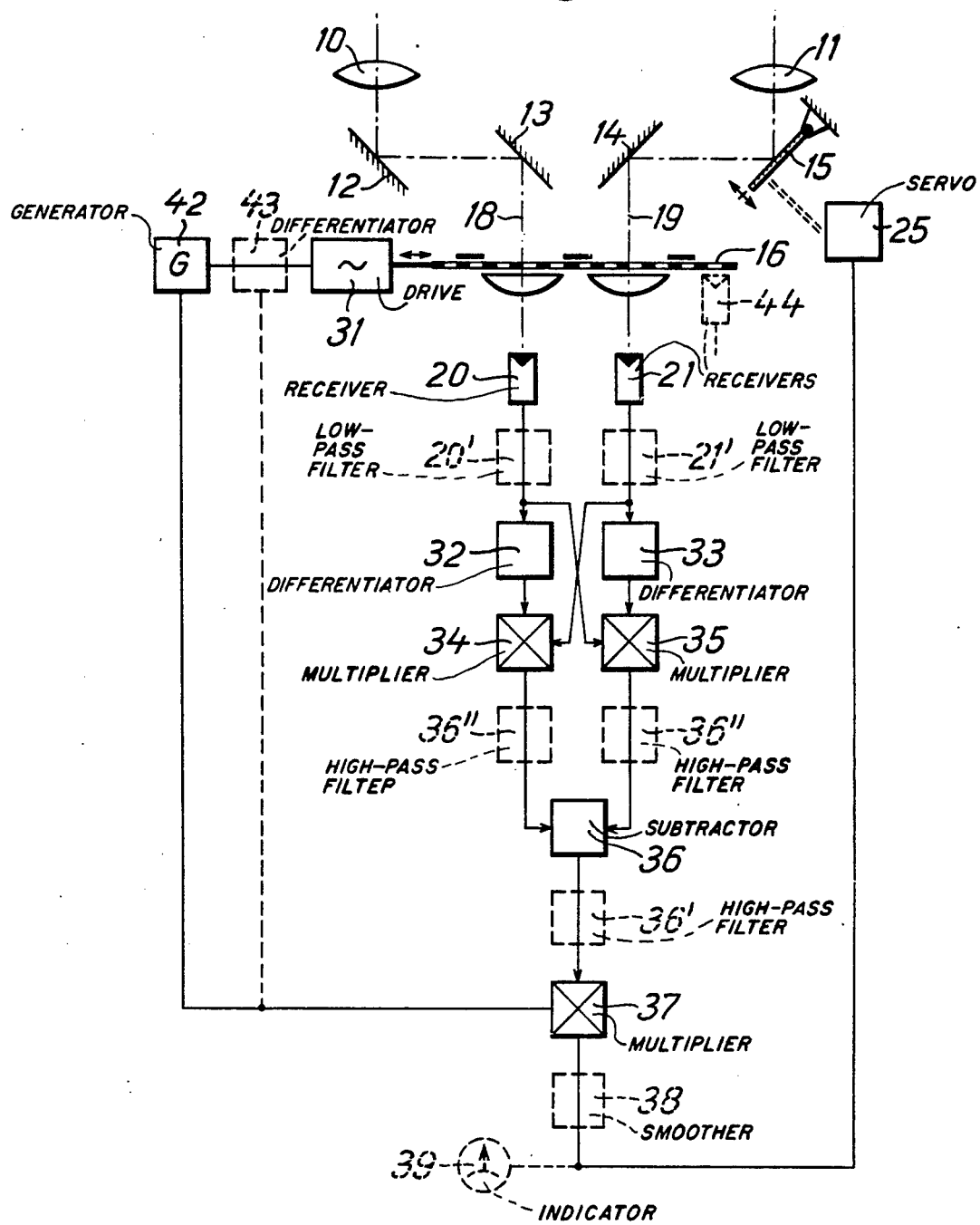
FIG. 2 shows in schematic representation an embodiment of the optical system of the invention using the method of the present invention.

In FIG. 2 is illustrated a base range finder system which comprises two objective lenses 10 and 11 determining two light channels or beams via fixed mirrors 12, 13 and 14 and movable mirror 15. The system further comprises a movable grating structure 16 which is moved perpendicularly to the optical axes 18 and 19 by means of a drive 31.

The grating structure 16 can be physically, for example, a grid or grating or can be functionally attained, for example, by means of ultrasonic or electrical diffraction signals.

The base range finder further comprises two photoelectric receivers 20 and 21 which each produces an electrical signal indicative of the light portions which have passed through the grating structure 16. Thus, the light channels are converted, respectively, into input signals $S_1(t)$ and $S_2(t)$ depending on the object (not shown) projected.

These two signals are fed to a differentiation means 32 and 33 and then the output signals are multiplied in multiplication means 34 and 35 with the respective opposite input signal. Thus, input signal $S_1(t)$ is multiplied with the output signal emanating from differentiation means 33 and input signal $S_2(t)$ is multiplied with the signal emanating from differentiation means 32.

The resultant signals are subtracted in a subtraction means 36. This subtraction means thus produces a subtraction signal which is fed to a second multiplication means 37 and the signal is multiplied with a reference signal. This multiplication operation produces an operating signal $S_c$.

Optionally, this operating signal can subsequently be smoothed when required or desired by means of a smoothing means 38 shown in dashed lines in FIG. 2. For smoothing, an integration means can be utilized.

Signal $S_c$ is then fed to the servo arrangement 25 which actuates the movable mirror 15 and/or to an indicating device 39 for display.

The reference signal referred to earlier can be produced in several ways. It can be produced by having a generator 42 actuate the grating structure 31, which generator 42 has a second output to produce also the reference signal. Alternatively, the reference signal can be produced by drawing directly from the supply signal of the grating drive 31 using a differentiation means 43 as shown in dashed lines in FIG. 2. Still another alternative is to provide an additional photoelectric receiver 44, likewise shown in dashed lines in FIG. 2, which directly scans the grating structure 16.

Multiplication step 37 can also be carried out as follows: It can be an analog multiplier or it can be, for instance, also a phase-sensitive rectifier, an electronic flip-flop or a ring modulator.

At times it is of advantage to improve the signal quality by eliminating signal components bearing no measuring informations, as for instance d.c. signal components from the output signal emanating from the subtraction step. For instance, this can be achieved by adding a high-pass filter 36' following the subtraction step 36 or, correspondingly, two high-pass filters 36" can be added following the multiplication step, i.e., following multiplication means 34 and 35.

The input signals can also be improved by adding low-pass filters 20' and 21' following photoelectric receivers 20 and 21 in order to reduce interference by interfering or noise signal components of these receivers.

The invention will be further described with reference to the following example which describes the method of the present invention with reference to a base range finder.

EXAMPLE

In line with its two image viewing channels, the base range finder has grating structures which oscillate with an amplitude of ¼ grating period. Thus, photoelectric receivers arranged behind the gratings will produce electrical signals $S_1$ and $S_2$, which are composed of a base wave portion $\sin \omega t$ and a harmonic wave portion $\cos 2\omega t$, respectively. Ideally, these two signals will be in the form:

$$S_1(t) = C_1(\cos \Phi \sin \omega t \stackrel{+}{\neq} K \sin \Phi \cos 2\omega t)$$

$$S_2(t) = C_2(\cos [\Phi + \Psi] \sin \omega t \stackrel{+}{\neq} K \sin [\Phi + \Psi] \cos 2\omega t)$$

wherein $C_1$ and $C_2$ are amplitude factors which are maintained relatively constant and of equal magnitude; $K$ is a factor which corresponds to the ratio of harmonic wave amplitude to base wave amplitude and which has the value of approximately 0.5 at the oscillating amplitude of ¼ grating period;

$\Psi$ is the phase difference resulting due to parallax between the two channels; and $\Phi$ is a random starting phase which is dependent on the resultant phase position between the picture of the object to be evaluated and the grating structure.

Next is will be necessary to determine the combination of the two signals which is independent of adjustment of the amplitudes of the two signals as well as the phase position $\Phi$. Furthermore, this combination should be achieved utilizing a minimal amount of expensive equipment.

According to the invention, the combination $$\overline{S_c = (S_1 \cdot \dot{S}_2 - S_2 \cdot \dot{S}_1) \cos \omega t}$$

is used wherein the dots above the letters indicate time differentiated signals. After substitution of the corresponding values the following is obtained:

$$S_c = -\tfrac{1}{2}\omega K C_1 C_2 \sin \Psi.$$

When $\Psi = 0$ in this equation, $S_c = 0$ as is desired and this result is independent of the values of $\Phi$, $C_1$ and $C_2$. However, when $\Psi \neq 0$, the values of the amplitudes become effective. Since $S_c$ is proportional to $\sin \Psi$, a symmetrical adjustment is possible, which is correct with respect to the sign, in the range of $\Psi = \pm 180°$.

As has been shown, according to the method of the invention, the phase difference that is due to parallax can be controlled independently of the magnitudes of the amplitudes of the input signals or their respective phase positions, respectively. The parallax can be reduced to zero in the closed control loop, for example, by means of optical adjustment mechanisms.

What is claimed is:

1. A method for automatically generating an electrical signal corresponding to parallax in a stereoscopic system, comprising the steps of:
    passing at least two imaging light channels through a moving grating structure;
    converting said light channels into separate first and second electrical input signals after passage through the grating structure;
    differentiating the first input signal to produce a first differentiated signal;
    differentiating the second input signal to produce a second differentiated signal;
    multiplying the first differentiated signal with the second input signal;
    multiplying the second differentiated signal with the first input signal; and
    subtracting one multiplied signal from the other multiplied signal to produce a signal difference corresponding to the parallax.

2. The method as defined by claim 1, further comprising the steps of:
    producing a reference signal responsive to the speed of movement of the grating structure; and
    multiplying the signal difference by the reference signal to produce an operating signal.

3. The method as defined by claim 2, further comprising the step of controlling the orientation of one of the imaging light channels in response to the operating signal.

4. The method as defined by claim 3, further comprising the step of feeding said operating signal to an indicating device.

5. The method as defined by claim 3, further comprising the step of feeding said operating signal to a servo arrangement.

6. The method as defined by claim 1, further comprising the step of filtering the input signals.

7. The method as defined by claim 2, further comprising the step of smoothing the operating signal.

8. The method as defined by claim 6, further comprising the step of eluminating signal components bearing no measuring informations from the signals to be subtracted.

9. The method as defined by claim 1, further comprising the step of eliminating signal components bearing no measuring informations from the signal difference.

10. The method as defined by claim 1, wherein two imaging light rays are passed through the grating structure.

11. A method for measuring distance, comprising the step of automatically determining parallax by the method as defined by claim 1.

12. A method for utilizing an electrical signal corresponding to parallax in a binary optical system, comprising the step of automatically eliminating parallax by the method as defined by claim 2.

13. An apparatus for automatically generating an electrical signal corresponding to parallax in a stereoscopic system, comprising:
    at least one movable grating structure;
    means for moving said grating structure;
    means for passing at least two imaging light channels through the moving grating structure;
    means for converting said light channels into separate first and second electrical input signals after passage through said grating structure;
    means for differentiating the first input signal to produce a first differentiated signal;
    means for differentiating the second input signal to produce a second differentiated signal;
    means for multiplying the second differentiated signal with the first input signal;
    means for multiplying the first differentiated signal with the second input signal; and
    means for subtracting one of the multiplied signals from the other multiplied signal to produce a signal difference corresponding to the parallax.

14. The apparatus as defined by claim 13, further comprising:
    means for producing a reference signal responsive to the speed of movement of the grating structure; and
    means for multiplying the signal difference by the reference signal to produce an operating signal.

15. The apparatus as defined by claim 13, further comprising means for controlling the orientation of one of the imaging light channels in response to the signal difference.

16. The apparatus as defined by claim 14, further comprising means for displaying the operating signal.

17. The apparatus as defined by claim 15, wherein said control means includes a servo mechanism.

18. The apparatus as defined by claim 14, further comprising means for filtering the input signals.

19. The apparatus as defined by claim 18, wherein said filtering means comprises at least one low-pass filter for each input signal.

20. The apparatus as defined by claim 18, further comprising means for smoothing said operating signal.

21. The apparatus as defined by claim 13, further comprising means for filtering the multiplied signals.

22. The apparatus as defined by claim 21, wherein said filtering means comprises at least one high-pass filter for each multiplied signal.

23. The apparatus as defined by claim 14, further comprising means for filtering said operating signal.

24. The apparatus as defined by claim 23, wherein said filtering means includes a high-pass filter.

25. The apparatus as defined by claim 14, wherein said reference signal producing means includes a differentiator associated with said grating moving means for differentiating a signal produced thereby.

26. The apparatus as defined by claim 14, wherein said reference signal-producing means includes a photoelectric signal-producing means positioned adjacent said grating structure and being directly responsive to movement of said grating structure.

27. The apparatus as defined by claim 14, wherein said grating structure moving means includes a generator and wherein said reference producing means includes an output terminal of said generator.

28. The apparatus as defined by claim 14, wherein said means for multiplying the signal difference comprises a phase-sensitive rectifier.

29. The apparatus as defined by claim 14, wherein said means for multiplying the signal difference comprises an electronic flip-flop.

30. The apparatus as defined by claim 14, wherein said means for multiplying the signal difference comprises a ring modulator.

* * * * *